July 2, 1946.  L. J. CLARK  2,403,261
FILTER
Filed April 1, 1944
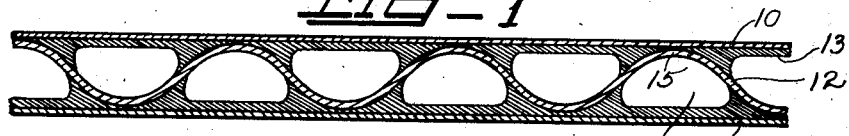
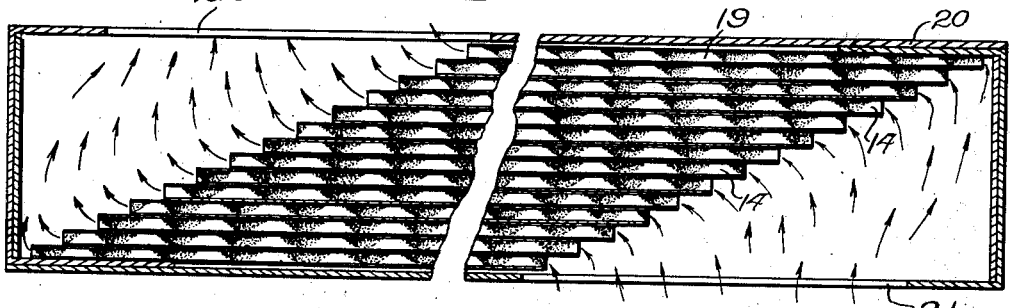
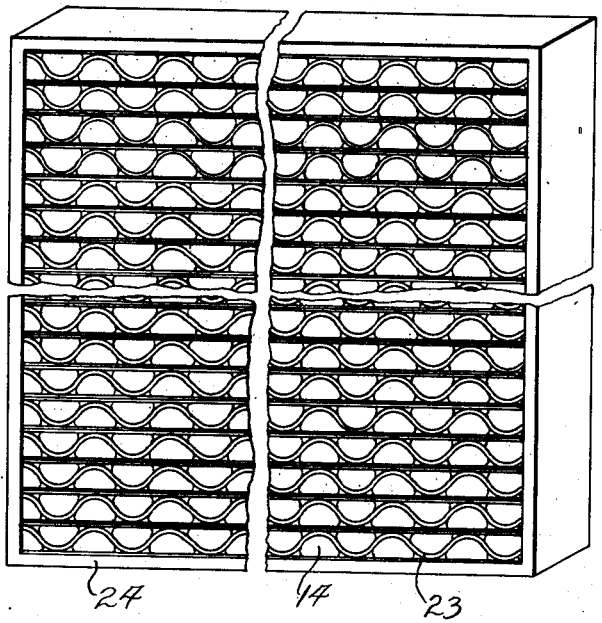
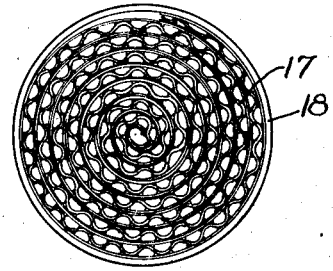
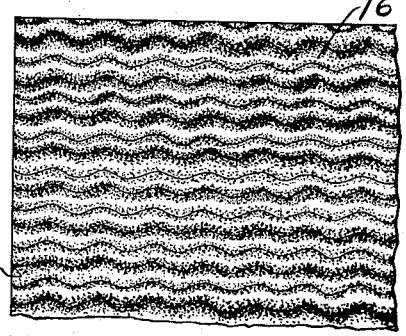
INVENTOR
Llewellynn J. Clark Patented July 2, 1946

2,403,261

UNITED STATES PATENT OFFICE 2,403,261

FILTER

Llewellynn J. Clark, Grand Rapids, Mich., assignor to The Tanglefoot Company, Grand Rapids, Mich., a corporation of Michigan Application April 1, 1944, Serial No. 529,063

2 Claims. (Cl. 183—75)

My invention relates to filter structures adapted particularly for cleaning or conditioning air or other gases by withholding and removing dust and other particles from the flowing air. More specifically, the invention contemplates the production of filtering structure in which flow passageways are provided whose walls have sticky or tacky substance applied to their inner faces so that dust or other foreign matter flowing through the passageways with air or gas will be caught by the sticky substance and thus withdrawn from the flow for cleaning and conditioning thereof.

So-called "Tanglefoot" sticky flypaper has been in use for many years for catching insects, and one of the objects of the invention is the utilization of such paper sheets coated with sticky substance in the production of filter fabric or elements for filtering and cleaning air or other gases.

In accordance with my invention the filtering fabric or element may be in sheet form comprising an intermediate channeled or corrugated sheet between outer sheets of paper coated on their inner sides with tacky substance which acts as a bond to secure the outer sheets to the intermediate sheet, and which is exposed in the passages defined by the sheets for catching and withdrawing dust or other foreign matter from the air or gas flowing through the passages. From the filtering fabric thus formed, various types of filter structures may be produced. For example the filter fabric may be cut into small sheets or units which may be assembled and arranged in various ways for flow of the air or gas through the sticky passages of the assembly.

The various features and utility of my invention will become apparent from the following specification and accompanying drawing, in which drawing:

Figure 1 is a transverse section of a portion of the filter fabric or element;

Figure 2 is a plan view of a portion of the intermediate or spacer element of the fabric;

Figure 3 shows the end of a filtering structure formed by rolling or winding up a length of the filtering fabric;

Figure 4 is a cross section of a filter structure in which the sheets of the filter fabric are assembled in stepped relation for intercepting air or gas flow for cleaning thereof; and Figure 5 shows sheets of the fabric assembled within a rectangular housing to form a filter structure cell or unit.

Referring to Figure 1 the filtering fabric is laminar and comprises the outer sheets 10 and 11 and the intermediate or spacer sheet 12. The outer sheets 10 and 11 are coated on one side with sticky substance 13, the spacer sheet 12 being interposed between the sticky sides of the outer sheets to be bonded thereto by the sticky material. This intermediate or spacer sheet is of sinuous cross section or corrugate form the crown or apex portions 15 being engaged by the sticky sides of the outer sheets so that the resulting passages 14 will be closed except for longitudinal flow therethrough of air or gas. With this arrangement the sticky material on the outer sheets between the crown portions of the corrugation will be exposed to the interior of the passages, but, by capillary attraction, the sticky substance will creep a distance along the side walls of the passages to increase the sticky area exposed to air or gas flow. Dust or other foreign particles in the air flow will strike the sticky surface and will be withheld from the flow for cleaning and conditioning thereof. In order to increase the effectiveness of withdrawal of dust and foreign particles from the air flow by the sticky substance, the intermediate sheet 12 may be constructed so that the channels therein are longitudinally wavy or sinuous as indicated at 16, Figure 2. With this arrangement the sticky area exposed to dust or other particles in the passages 14 will be materially increased without any substantial interference with or reduction of the air flow through the passages.

The sticky substance should be such that it will be non-running but sufficiently tacky through a relatively wide range of temperature. For example, the sticky substance could be such that it would not run at 135° F. and would still stay tacky at —20° F. A formula to be used might be the following:

| | Per cent |
|---|---|
| Non-drying vegetable oil from | 25 to 35 |
| Blown non-drying vegetable oil | 5 to 10 |
| Wood rosin | 55 to 65 |
| Vegetable wax (carnauba wax) | 2 to 6 |

In the fabrication of the filter units or sheets, the outer sheets 10 and 11 are preferably of paper impervious to the sticky substance so that the outer sides thereof will not be sticky. The inner or spacer element 12 could be of paper of a more fibrous or porous nature so that the sticky substance from the outer layers may travel therealong by capillary attraction or ooze through the pores thereof, thus to further increase the sticky area exposed in the passages 14 to the air or gas flow.

Figure 3 shows a cylindrical filter structure in which a band of the filter fabric is wound into a roll 17 and housed within a tubular container 18. A filter structure of this shape may be readily included in piping through which air or gas flows to be cleaned by the filter roll.

Figure 4 shows a filter structure in which a plurality of rectangular sheets 19 of the filter fabric are stacked together in stepped relation within a suitable container or housing 20 having an inlet opening 21 in one side and an outlet opening 22 in the other side. When this filter structure is placed in the path of air or gas to be cleaned, the air or gas will flow through the inlet opening 21 for distribution of the flow through the passages 14 of the filter sheets for outflow from the other ends thereof into the outlet 22 of the housing.

Figure 5 shows a plurality of rectangular sheets 23 of the filter fabric assembled in a vertical stack within a rectangular box or housing 24 to form a filtering structure unit or cell which may be used alone or of which a number could be assembled and arranged to form a filter structure. Other forms and shapes of filter structures could readily be built up by lengths or unit pieces of the filter fabric.

It will of course be understood that various details of construction and arrangement may be varied through a wide range without departing from the principles of this invention and it is therefore not the purpose to limit the patent granted hereon otherwise than necessitated by the scope of the appended claims.

I claim as my invention:

1. A self-supporting air filtering unit formed with a plurality of air passages through it having a tacky substance on the walls of said passages of such viscosity as to be retained as a coating on the walls for removing dirt from air flowing through said passages, said unit consisting of two fibrous outer sheets of material impervious to the tacky substance used to prevent the outer surfaces of the outer sheets from becoming sticky, an intermediate sheet of sinuous form between said outer sheets to separate them, said intermediate sheet being pervious to the tacky substance used, the inner surfaces of the outer sheets being coated with a tacky substance, said tacky substance constituting the sole means for bonding the intermediate sheet to the outer sheets to complete the unit, the said three sheets forming a filter unit defining flow passages for circulating air in which the exposed tacky substance serves to remove the dirt from the flow.

2. A self-supporting air filtering unit formed with a plurality of air passages through it having a tacky substance on the walls of said passages of such viscosity as to be retained as a coating on said walls for removing dirt from air flowing through said passages, said unit consisting of two outer sheets spaced apart and an intermediate sheet of sinuous form separating the outer sheets and defining a plurality of air passages through said unit, a tacky substance covering the inner surfaces of the outer sheets and the intermediate sheet, the said sheets being of fibrous material unlike in perviousness to the tacky substance, the outer sheets being impervious to the tacky substance to prevent the outer surfaces thereof from becoming sticky and the intermediate sheet being porous and pervious to the tacky substance so that said substance may travel therealong by capillary action through the pores of said intermediate sheet.

LLEWELLYNN J. CLARK.